H. G. BUDDECKE.
MIXING MACHINE FOR SALAD DRESSINGS.
APPLICATION FILED FEB. 29, 1916.
1,233,023.
Patented July 10, 1917.
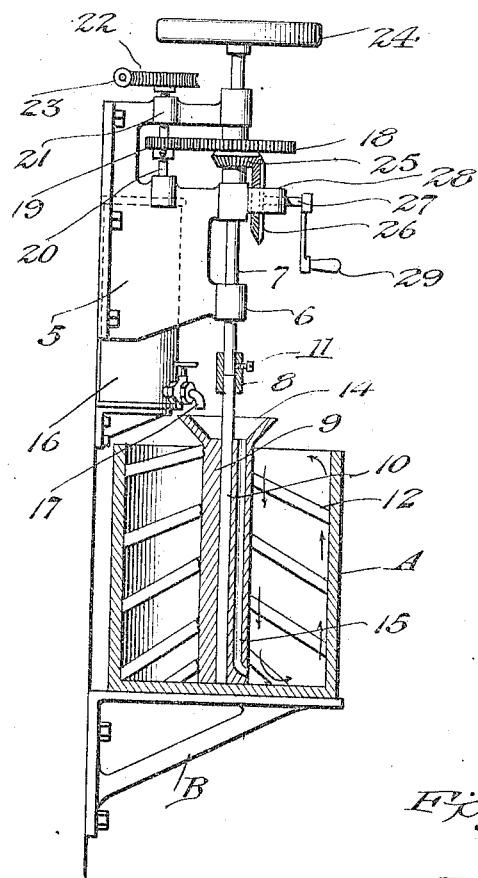
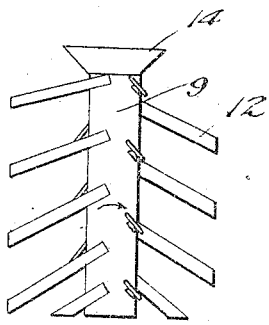
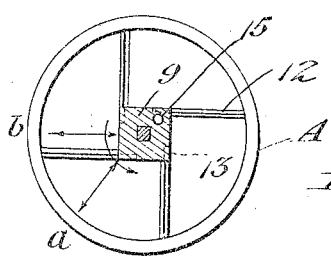
Witnesses
A. V. Doyle
Inventor,
Henry G. Buddecke
By Victor J. Evans,
Attorney.

UNITED STATES PATENT OFFICE.

HENRY G. BUDDECKE, OF BROOKLYN, NEW YORK.

MIXING-MACHINE FOR SALAD-DRESSINGS.

1,233,023.   Specification of Letters Patent.   Patented July 10, 1917.

Application filed February 29, 1916. Serial No. 81,281.

*To all whom it may concern:*

Be it known that I, HENRY G. BUDDECKE, a subject of the Emperor of Germany, residing at Brooklyn, in the county of Kings and State of New York, have invented new and useful Improvements in Mixing-Machines for Salad-Dressings, of which the following is a specification.

The invention relates to agitators, and more particularly to the class of mixing machines for preparing salad dressings.

The making of mayonnaise dressing in which all the ingredients are thoroughly mixed and well emulsified and which is known to the epicure as "smooth", involves a certain knack beyond the mere selection of proper ingredients of good grade and in the correct proportion. What might be called the solid or viscid constituents in contra-distinction to the oil, are ordinarily first selected with great care and assembled in a container of proper proportions, and the oil added last. It is the general custom to drop this oil onto the viscid constituents or to supply it very slowly thereto, stirring thoroughly meanwhile so as to incorporate the oil with the other constituents as rapidly as they will take it up, for if supplied too rapidly to the surface it remains floating thereon. It has been proposed to provide means for supplying this oil to the bottom of the viscid mass, and then agitate the same so as to commingle the globules of oil with the other constituents as said globules rise by reason of their relative difference in specific gravity. Numerous machines have been devised also having beaters or dashers for agitating the entire contents of the container, both before and after the admission of the oil, but I find that when the latter is admitted at the bottom it is not thoroughly and successfully emulsified by the use of agitators of those types which simply stir the mass by moving a multiplicity of blades through it in various directions. After repeated experiments I have discovered that the best results flow from a construction wherein the viscid mass is kneaded throughout its entire depth in the container, at the same time that the oil is supplied to the bottom of the mass; and also that the best results are achieved by the employment of an agitator of that type in which the mass during such kneading operation is impelled away from the point of inlet of the oil, carried to the sides of the container and up the same, then inward toward the center, and down again to the point of oil admission in a manner to be explained below.

The present invention, therefore, contemplates such construction of a mixing machine for mayonnaise and other salad dressings as will admit the oil at the bottom of the container, knead the viscid mass therein and simultaneously agitate it, and meanwhile cause it to flow through the path outlined above. The preferred embodiment of my idea is set forth in the following specification to which reference is made for the details of construction.

In the accompanying drawings:

Figure 1 is a side elevation of a mixing machine constructed in accordance with the invention, showing the ingredient container and the agitator in vertical section;

Fig. 2 is a horizontal transverse sectional view through the agitator and a plan of the container;

Fig. 3 is a side elevation of the agitator; and

Fig. 4 is a perspective view of one of the agitator arms or blades.

Similar reference characters indicate corresponding parts throughout the several views of the drawing.

Referring to the drawing in detail, A designates a portion of a container which is adapted to receive the ingredients forming the constituents in the preparation of the salad dressing, and in this instance the container is of cylindrical formation, and is supported upon a shelf B which is suitably fixed to a vertical wall or support.

At a point above the container A and suitably fixed to the wall or support is a casting which consists of a frame 5, formed with bearings 6 in which is journaled a vertically disposed rotatable shaft 7 which carries at its lower end a slidable coupling sleeve 8 for the detachable connection of the shaft with an agitator hereinafter fully described.

The agitator has a hub 9 preferably made from wood and of rectangular shape in cross section for a major portion of its length, the hub being fitted upon a central coupling shaft 10 which is also preferably of square formation in cross section and has its upper end detachably engaged in the coupling sleeve 8 which is adjustably fastened upon the shaft 7 through the medium of a binding screw 11, as shown, so that on the rotation of the said shaft 7 the shaft 10 will rotate simultaneously therewith for the driving of the agitator. By sliding the sleeve upward the shafts 10 and 11 may be disconnected and the container and agitator removed from the shelf when desired, and thereafter they may be separated as for cleaning purposes and the removal of the finished dressing.

Each of the four flat faces of the hub carries an upright series of agitator arms or blades 12, and those in one series may be disposed in staggered relation to those of the series which follow in the direction of rotation. By preference the inner end of each blade is provided with a reduced tenon 13 of dove tailed cross section, fitted into a correspondingly shaped recess in the hub so that the flat body of the blade will retain the position to which it is set, and by preference also each blade inclined downward slightly as it recedes from the hub. The outer extremities of the lowermost blades may scrape on the bottom of the container A, and the similar extremities of the remaining blades may scrape on its side wall—thereby preventing the adhesion of the viscid mass which is usually quite dense and sticky, especially before the introduction of the oil. The general contour of the agitator is cylindrical so that its blades keep it centered within the container and the lower end of its hub rests on the lower bottom thereof without the necessity for any bearing, and when it is removed the interior of the container may be readily cleaned. It is an important feature of my invention, however, that the tenon and socket connection of each paddle or blade with the hub be such that its body projects tangentially rather than diametrically from the hub, and also that each blade of the series be set a little oblique to the line of such series or "feathered" so that, in the direction of rotation, the face of the blade will incline upward and rearward as will be clear from the short arrows in Figs. 2 and 3 which indicate the direction in which the hub turns.

It follows from this construction that when the agitator as a whole is rotated within the container by means yet to be described, the corners of the hub 9 have a constant kneading action on the mass of material immediately surrounding the hub; and each blade as it is swung around the hub during the revolution of the latter travels through a zone whose depth is equal to the distance from the higher inner end of the blade to the lower outer end of the same and whose radius is equal to the distance from the hub to the inner face of the container. But the inner end of this radius is constantly changing as the corners of the hub pass through the mass immediately surrounding it during the kneading action referred to, and just at the moment when the radius is shortest and the mass is, as it were, under radial compression, the inner end of the blade is drawn through such radius as it sweeps around the hub. From another view-point, each blade moves with a draw cut through the mass, its inner end traveling slightly in advance of its outer end by reason of its tangential disposition on the hub, said inner end cutting the mass when it is compressed by the hub-corner while its outer end cuts the mass nearer the wall of the container and at a point a little behind that which is cut by the inner end; and meanwhile the oblique disposition or "feather" of the working face of the blade tends to impel the mass upward within the container. This upward tendency, however, is greater toward said wall than nearer the hub, by reason of the fact that the outer ends of the arms move more rapidly than the inner ends. That is to say, while they of course actually move in the same time, they move through a greater distance or a longer path and therefore through a greater amount of the mass than the inner ends, and they move through that portion of the mass which is quiescent or less subjected to the kneading action than immediately around the hub. The result is that I have observed at the top of a charge within a container, a rise of that portion of the mass near its wall, a current thence inward toward its hub, and from a point immediately around the latter a downward current along a path surrounding the hub where the mass is subjected to the kneading pulsations described: Therefore theoretically I conclude that the current set up is that indicated by the arrows in Fig. 1 and the flow at the bottom of the container is from its center outward.

Formed at the upper end of the hub 9 is a hopper 14 which communicates with a feed duct or conduit 15 cored off center longitudinally through the hub with its lower end opening through one side thereof for the delivery of oil introduced into the hopper 14 into the container near the bottom thereof during the rotation of the agitator. Mounted above the container A and supported upon the wall or other suitable support is an oil tank or reservoir 16 having a valved discharge spout or faucet 17 which delivers the oil within the tank or reservoir into the hopper 14 on the opening of the valve in the said spout or faucet.

Fixed to the shaft 7 is a gear 18, the frame 5 being cut away to accommodate the same, and this gear meshes with a pinion 19 fixed to a countershaft 20 journaled in bearings 21 formed on the frame 5, the said shaft 20 being also fitted with a worm gear 22 meshing with a worm 23 which is driven from any suitable source of motive power, and in this manner the agitator is rotated. Fixed to the upper end of the shaft 7 is a balance wheel 24, while formed on the gear 18 or fixed to the shaft 7 is a beveled pinion 25 which meshes with a beveled gear 26 fixed to a stub shaft 27 journaled in a bearing 28 on the frame 5, and this shaft 27 has fitted thereto a hand crank 29 which permits the manual rotation of the shaft 7 when the occasion requires. It will be apparent that the agitator can be driven or rotated from a motor or by hand, as may be desired.

In the preparation of mayonnaise dressing with this improved machine, all of the constituents excepting the oil are placed within the container A, probably while the agitator stands therein, and the same mounted on the shaft B and the shafts 7 and 10 connected at 8; and the oil is placed within the tank 16 with the faucet 17 closed. The agitator is now rotated to thoroughly commingle the ingredients within the container, break up their lumps, and form them into a homogeneous viscid mass. Then the faucet 17 is opened to a greater or lesser degree, and oil permitted to drip or flow slowly into the funnel 14, whence it passes down the duct 15 through the rotating hub and out at the lower end of such duct just above the bottom of the container. Here the oil is admitted to the bottom of the viscid mass, and continued rotation of the agitator which sets up a current in said mass as indicated by the arrows in Fig. 1, draws the oil from the outlet of the duct radially outward along the bottom of the container, upward along its wall, inward along the top of the mass, and downward alongside the hub. Meanwhile the corners of the hub exert kneading pulsations as indicated by the line $a$ in Fig. 2, compressing the mass at points between the blades because the length of this line $a$ is less than that of the line $b$ at and just in rear of the blade and where the flat faces of the hub occurs. Immediately following each compression impulse the inner and forward end of the blades in any given series enters that portion of the mass so compressed, and is followed by the tangential remaining portion or body of the blade which sweeps obliquely through the mass so that by the time the outer end of the blade cuts through it the compression impulse has been exhausted and this portion of the mass has expanded as at $b$; therefore it is susceptible to the screw action of the oblique working face of the blade and this portion of the mass, now under less compression, is impelled upward within the wall of the container as above explained. The result is that by the use of this machine the oil is fed to the bottom of the viscid ingredients and is kneaded and stirred into them and drawn from the oil outlet radially outward, and then caused to follow the current set up by the rotation of the hub and its blades.

It is obvious that by use of the machine all of the constituents excepting the oil can be introduced into a container and thereafter the oil supplied to the container near the bottom thereof so that the oil and constituents when agitated will be worked upwardly under the action of the agitator, and in this manner the viscid ingredients and oil will become thoroughly emulsified and commingled with each other for the perfect preparation of the salad dressing to assure the desired smoothness which is so difficult to attain by manual feed of the oil.

Having thus described my invention, I claim:

In a mayonnaise mixer, an upright cylindrical container, and an agitator therein comprising a hub square in cross section and having a longitudinal duct opening at its upper end and laterally near its lower end, and blades disposed in upright series around said hub and projecting from it into contact with the wall of the container, each blade inclined outward and downward and with its forward face in the direction of rotation pitched to produce a current upward along said wall; combined with means for rotating the agitator, and means for feeding a regulated supply of oil to the duct.

In testimony whereof I affix my signature in presence of a witness.

HENRY G. BUDDECKE.

Witness:
ANNA V. DOYLE.

Copies of this patent may be obtained for five cents each, by addressing the "Commissioner of Patents, Washington, D. C."